United States Patent
Tamai et al.

(10) Patent No.: US 6,198,202 B1
(45) Date of Patent: *Mar. 6, 2001

(54) VIBRATION ACTUATOR

(75) Inventors: Jun Tamai; Ichiro Okumura, both of Yokohama; Kazuki Fujimoto, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,506

(22) Filed: Apr. 4, 1997

Related U.S. Application Data

(63) Continuation of application No. 08/509,935, filed on Aug. 1, 1995, now abandoned.

(30) Foreign Application Priority Data

Aug. 4, 1994 (JP) .................................. 6-183406
Jun. 30, 1995 (JP) .................................. 7-165918

(51) Int. Cl.$^7$ .................................................. H02N 2/12
(52) U.S. Cl. ............................... 310/323.15; 310/323.13
(58) Field of Search ........................... 310/323.15, 323.13

(56) References Cited

U.S. PATENT DOCUMENTS

| 4,580,073 | 4/1986 | Okumura et al. | 310/323 |
|---|---|---|---|
| 4,771,203 | * 9/1988 | Mukohjima et al. | 310/323 |
| 4,831,305 | * 5/1989 | Mukohjima et al. | 310/323 |
| 5,028,833 | * 7/1991 | Kawai | 310/323 |
| 5,148,075 | * 9/1992 | Shirasahi | 310/323 |
| 5,204,577 | * 4/1993 | Watanabe et al. | 310/323 |
| 5,256,928 | * 10/1993 | Nishikura et al. | 310/323 |
| 5,274,295 | * 12/1993 | Tsukimoto et al. | 310/323 |
| 5,338,998 | * 8/1994 | Kitani et al. | 310/323 |
| 5,347,192 | * 9/1994 | Mukhojima et al. | 310/323 |

FOREIGN PATENT DOCUMENTS

| 0 553 828 | 8/1993 | (EP) | H01L/41/09 |
|---|---|---|---|
| 0600484A1 | 6/1994 | (EP) | H01L/41/09 |
| 0224679 | * 9/1988 | (JP) | 310/323 |
| 2-0017874 | * 1/1990 | (JP) | 310/323 |
| 3-49573 | 3/1991 | (JP) | H02N/2/00 |
| 4-21193 | 2/1992 | (JP) | H02N/2/00 |
| 5-219762 | 8/1993 | (JP) | H02N/2/00 |
| 5-300768 | 11/1993 | (JP) | H02N/2/00 |
| 6-153548 | * 5/1994 | (JP) | 310/328 |

* cited by examiner

Primary Examiner—Thomas M. Dougherty
(74) Attorney, Agent, or Firm—Fitzpatrick, Cella, Harper & Scinto

(57) ABSTRACT

A vibration actuator has a vibration member for generating a vibration, and a contact member which contacts the vibration member and moves relative thereto when the vibration member vibrates. A portion of the vibration member, which is in sliding-contact with the contact member, is formed as a separate first member which is coupled to rest of the vibration member.

40 Claims, 15 Drawing Sheets

| FLANGE MEMBER | | | SLIDING MEMBER FOR VIBRATION MEMBER | | |
|---|---|---|---|---|---|
| MATERIAL | MANUFACTURE METHOD | HARDNESS | MATERIAL | MANUFACTURE METHOD | HARDNESS |
| MARTENSITIC STAINLESS STEEL JIS SUS440C | QUENCH AND TENPER AFTER PRESS WORKING | 700Hv | EXTRA HARD WC 90% Co 10% | POWDER SINTER | 90H$_R$A |
| PRECIPITATION HARDENING STAINLESS STEEL JIS SUS631 | AGEING TREATMENT AFTER PRESS WORKING | 580Hv | ALUMINA CERAMICS PURITY 99.7% | POWDER SINTER | 1,400Hv |
| AUSTENITIC STAINLESS STEEL JIS SUS316 | NITRIDING TREATMENT AFTER PRESS WORKING | NITRIDE FILM 1,100Hv | TiC CVD | DEPOSITION TREATMENT TO HIGH SPEED STEEL | FILM 2,500Hv |
| MARTENSITIC STAINLESS STEEL JIS SUS420J2 | QUENCH AND TENPER AFTER PRESS WORKING | 650Hv | Cr-Mo FILM | GALVANIZING TO TOOL STEEL | FILM 1,350Hv |
| PRECIPITATION HARDENING STAINLESS STEEL JIS SUS631 | AGEING TREATMENT AFTER PRESS WORKING | 580Hv | MARTENSITIC STAINLESS STEEL SUS 440C | QUENCH AND TENPER AFTER PRESS WORKING | 700Hv |
| MARTENSITIC STAINLESS STEEL JIS SUS440C | QUENCH AND TENPER AFTER PRESS WORKING | 700Hv | MARTENSITIC STAINLESS STEEL SUS 440C | QUENCH AND TENPER AFTER PRESS WORKING | 700Hv |

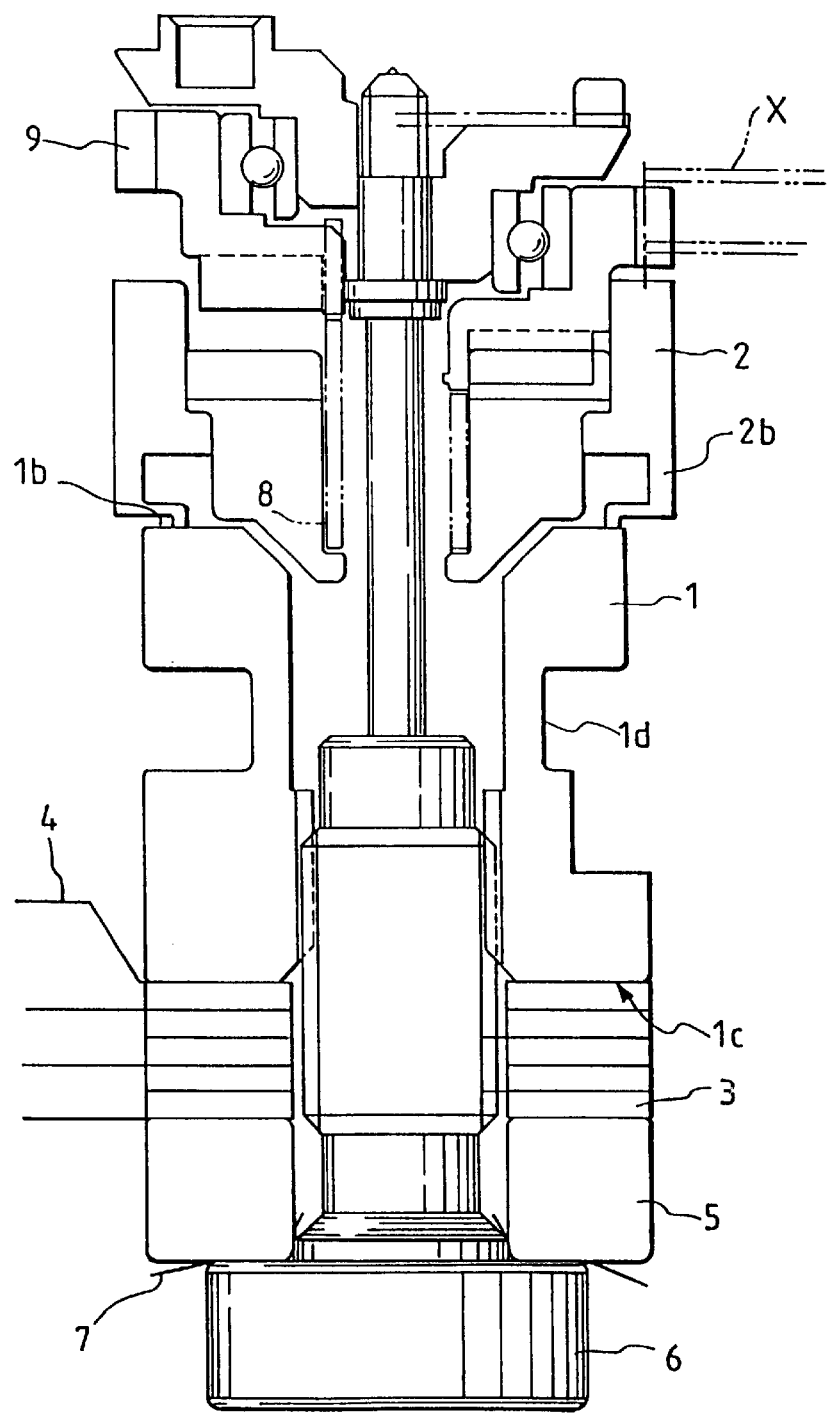

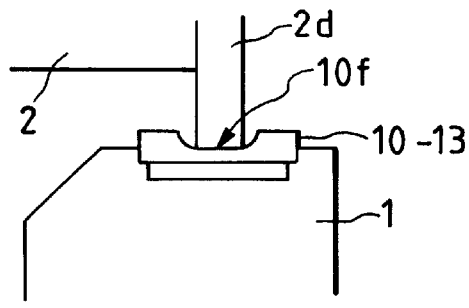
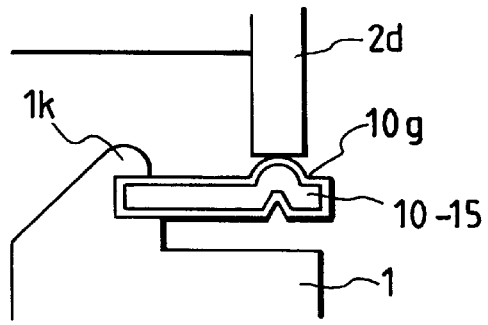
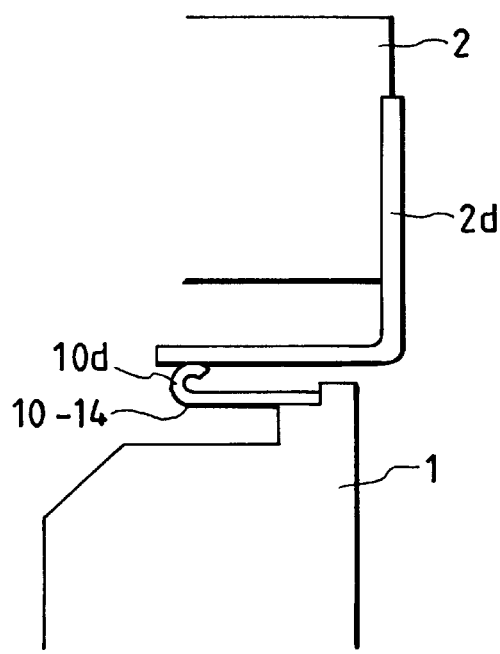
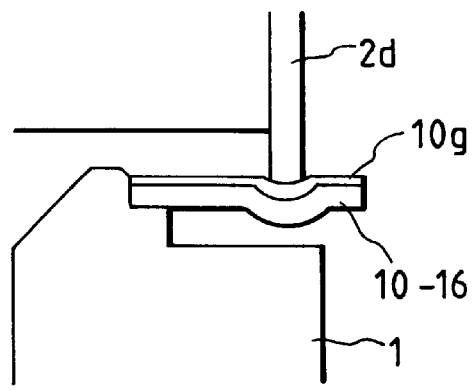
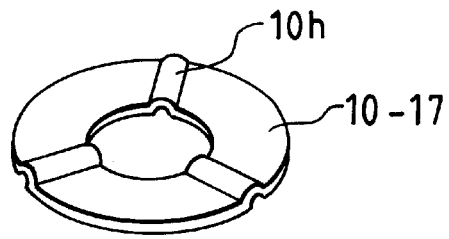

FIG. 7

| FLANGE MEMBER | | | SLIDING MEMBER FOR VIBRATION MEMBER | | |
|---|---|---|---|---|---|
| MATERIAL | MANUFACTURE METHOD | HARDNESS | MATERIAL | MANUFACTURE METHOD | HARDNESS |
| MARTENSITIC STAINLESS STEEL JIS SUS440C | QUENCH AND TENPER AFTER PRESS WORKING | 700Hv | EXTRA HARD WC 90% Co 10% | POWDER SINTER | 90HrA |
| PRECIPITATION HARDENING STAINLESS STEEL JIS SUS631 | AGEING TREATMENT AFTER PRESS WORKING | 580Hv | ALUMINA CERAMICS PURITY 99.7% | POWDER SINTER | 1,400Hv |
| AUSTENITIC STAINLESS STEEL JIS SUS316 | NITRIDING TREATMENT AFTER PRESS WORKING | NITRIDE FILM 1,100Hv | TiC CVD | DEPOSITION TREATMENT TO HIGH SPEED STEEL | FILM 2,500Hv |
| MARTENSITIC STAINLESS STEEL JIS SUS420J2 | QUENCH AND TENPER AFTER PRESS WORKING | 650Hv | Cr-Mo FILM | GALVANIZING TO TOOL STEEL | FILM 1,350Hv |
| PRECIPITATION HARDENING STAINLESS STEEL JIS SUS631 | AGEING TREATMENT AFTER PRESS WORKING | 580Hv | MARTENSITIC STAINLESS STEEL SUS 440C | QUENCH AND TENPER AFTER PRESS WORKING | 700Hv |
| MARTENSITIC STAINLESS STEEL JIS SUS440C | QUENCH AND TENPER AFTER PRESS WORKING | 700Hv | MARTENSITIC STAINLESS STEEL SUS 440C | QUENCH AND TENPER AFTER PRESS WORKING | 700Hv |

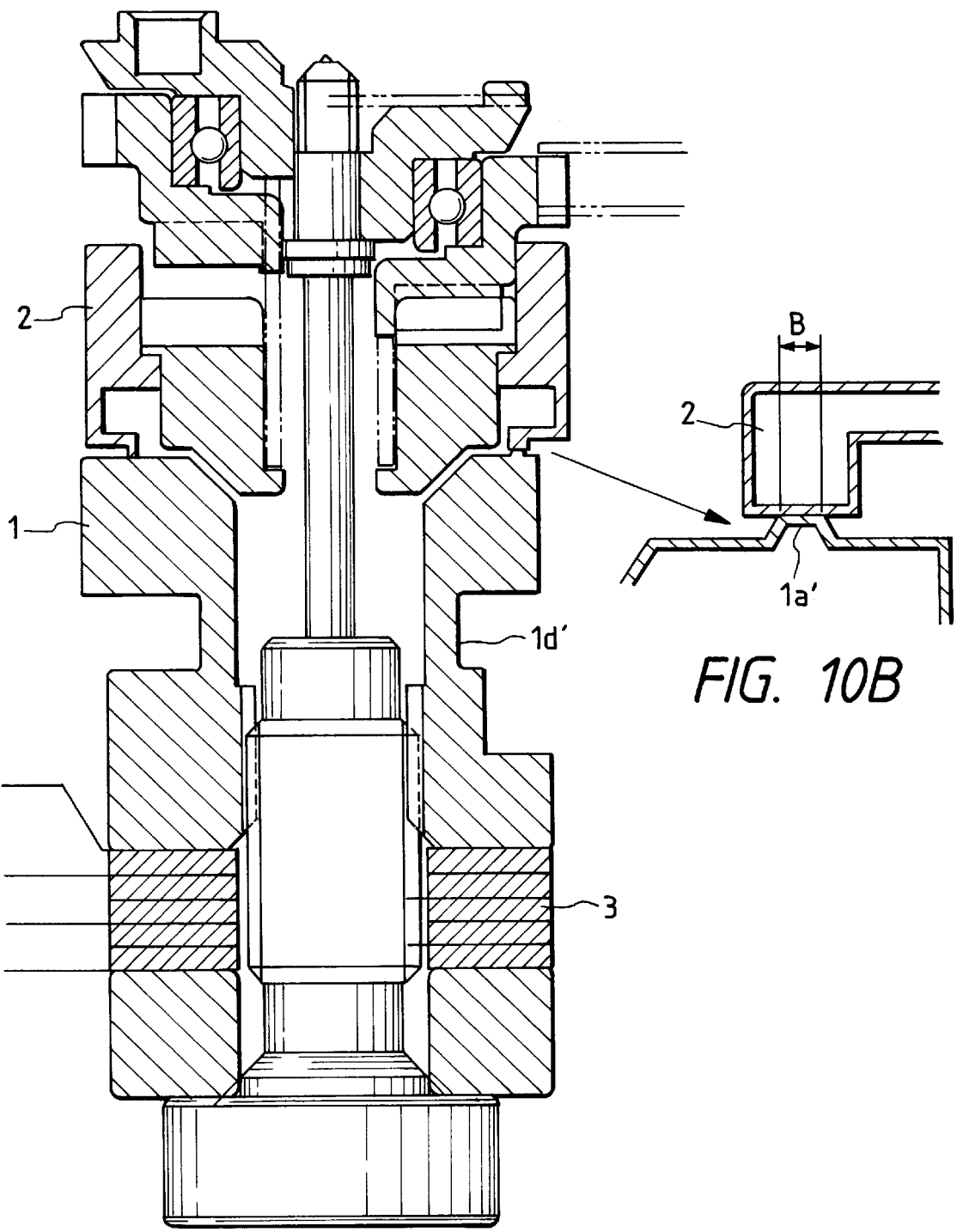

IN CASE OF LOW TEMPERATURE (-20°C)

IN CASE OF HIGH TEMPERATURE (45°C)

IN CASE OF ORDINARY TEMPERATURE

IN CASE OF HIGH TEMPERATURE

IN CASE OF LOW TEMPERATURE

VIBRATION ACTUATOR

This application is a continuation of application Ser. No. 08/509,935, filed Aug. 1, 1995, now abandoned.

BACKGROUND OF THE INVENTION

1. Field of the Invention

The present invention relates to a vibration actuator for relatively moving a contact body by a vibration produced in a vibrator.

2. Related Background Art

FIGS. 10A and 10B are sectional views of a rod-shaped ultrasonic wave motor described in U.S. Ser. No. 340,469 as the prior art of the present invention. A vibration member 1 generates an oscillating vibration upon application of AC voltages to a piezoelectric member 3, and the surface particles of a sliding portion B make an elliptic motion. On the other hand, a movable member 2 is in press-contact with the sliding portion B and receives a frictional driving force from the vibration member. At this time, a friction layer 1a on the vibration member side is an Ni-P-SiC composite galvanized layer, and is formed on the entire surface of the vibration member 1.

In this prior art, the function required of the friction layer is given by the composite galvanized layer. However, the galvanized layer must be formed on a portion that is not associated with the required function. When the galvanized layer itself can be uniformly and smoothly formed on the entire surface, this problem is concluded as only a wasteful treatment. However, a post-treatment is required after the galvanizing treatment due to the nonuniformity of the thickness, surface roughness, and warp of the galvanized layer. As a first example, since a sliding layer 1a' of the vibration member must effectively receive a minute displacement of the piezoelectric member, it must be finished to have a surface precision as high as that obtained by cutting or grinding. Thus, the sliding surface is subjected to lapping after the galvanizing treatment, in practice. The same applies to an actuator of a type in which a piezoelectric member is adhered to a vibration member. As a second example, since the resonance frequency of a vibration mode used for frictional driving must fall within a predetermined range, the galvanized portion must be removed in the post-treatment. More specifically, in the prior art shown in FIG. 10, the galvanized layer attached to a constricted portion 1d' of the vibration member 1 must be locally removed to adjust the resonance frequency to a predetermined value. This process is discussed in detail in Japanese Laid-Open Patent Application No. 5-300768, and a detailed description thereof will be omitted.

On the other hand, some attempts have been made to utilize a resin, rubber, or the like as the friction layer. However, with this method, since the resin or rubber has a low rigidity, a molded member consisting of such a material cannot maintain a predetermined shape, and it becomes difficult to maintain high positional precision if such a member is coupled to the vibration member. On the other hand, when the molded member whose rigidity is increased by increasing its thickness is coupled to the vibration member, since the resin or rubber has large vibration attenuation, the energy loss of the motor becomes undesirably large.

SUMMARY OF THE INVENTION

The present invention has as its object to solve the above-mentioned conventional problems. As means for achieving the object of the present invention, a single conventional member is divided into two or more members, these members are separately manufactured in advance, and the members are coupled to obtain a member for a vibration member.

In other words, a functional portion required for a sliding friction layer, a portion required for magnifying a displacement of a sliding portion, and a structural portion required for a vibration member are separately formed in advance, and are then coupled to each other without disturbing the vibration performance of the vibration member.

BRIEF DESCRIPTION OF THE DRAWINGS

FIG. 1 is a sectional view of an ultrasonic wave motor as a basis of the first embodiment;

FIGS. 5A to 5E are enlarged views showing principal parts of the second embodiment;

FIG. 7 is a table showing a list of performances in units of materials;

FIGS. 10A and 10B are explanatory views showing the prior art;

DETAILED DESCRIPTION OF THE PREFERRED EMBODIMENTS

First Embodiment

Figure 2A:
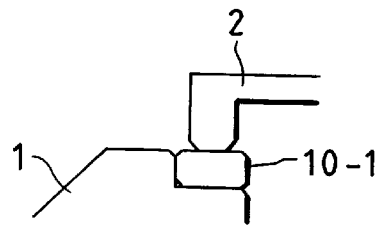
FIGS. 2A to 2H are enlarged views showing principal parts of the first embodiment.

FIG. 1 shows an ultrasonic wave motor as a vibration wave actuator serving as the presupposition of the first embodiment according to the present invention. FIG. 1 is a longitudinal sectional view of the entire motor.

A vibration member as a vibrator is constituted by sandwiching driving and sensor piezoelectric members (electromechanical or mechano-electrical energy conversion members) 3 and electrode plates 4 between upper and lower vibration member structural bodies 1 and 5, and then fastening them using a bolt 6. In order to electrically isolate the upper vibration member structural body 1 from the bolt 6, an insulating sheet 7 is inserted therebetween. The magnitude of a vibration displacement produced on a sliding surface 1b of the vibration member is adjusted by the diameter of a constricted portion 1d. A sliding surface 2b of a movable member 2 as a contact body is pressed against the sliding surface 1b by the expanding force of a coil spring 8. A displacement produced on the sliding surface 1b of the vibration member is transmitted to the movable member 2 via friction, and is output to an external portion via a gear 9. Note that the rotation of the gear 9 is transmitted to a gear X constituting a portion of a system.

FIGS. 2A to 2H show the first embodiment. FIG. 2A shows an example wherein a sliding member 10-1 as a separate member is press-fitted on and coupled to the upper vibration member structural body 1. Conventionally, an Ni-P-SiC galvanized layer is formed on the entire surface of the upper vibration member structural body 1. However, in this embodiment, brass (JIS C3604) is directly used without any surface treatment. The sliding member 10-1 was manufactured by punching a precipitation hardening stainless steel plate into a ring shape by press working, and removing burrs, corner slopes, and the like by barrel finishing. Since such a shape can be easily manufactured by press working, the number of processes can be greatly reduced as compared to a working method such as cutting. The hardness of the stainless steel used was about 480 Hv (Vickers hardness), but could be increased to about 580 Hv (Vickers hardness) by performing an aging treatment of the stainless steel at a low temperature of 475° C. In this manner, when a precipitation hardening material is used, it can be easily worked since it is relatively soft. In addition, since a hardening treatment for reducing the sliding wear amount is performed at a low temperature which causes almost no residual distortion, deformation and scaling are hard to occur.

Of course, martensitic stainless steel may be used, or austenitic stainless steel may be used after it is subjected to cold rolling to form a working-induced martensitic texture. Furthermore, austenitic stainless steel (JIS SUS316) with a high corrosion resistance may be used after its surface is subjected to a nitriding treatment. On the other hand, the movable member is manufactured by hard-anodizing an aluminum alloy (JIS A5056H34).

Figure 2E:
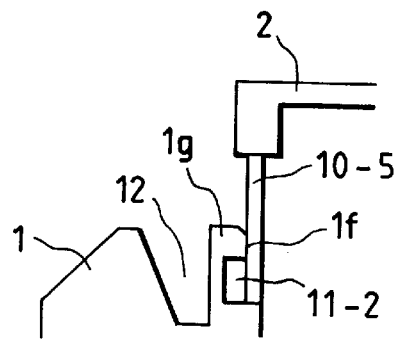
Figure 2B:
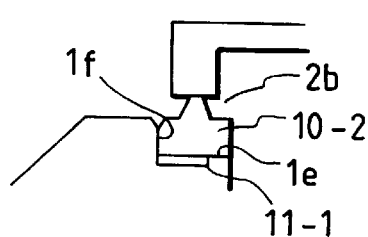

FIG. 2B shows an example wherein a projection having a trapezoidal section is formed on the end face of a sliding member. This sliding member 10-2 including the projection can be formed by cutting, sintering, press working, or the like. In the case of press working, the projection can be easily formed by pressing in the surface opposite to the projection.

Due to the presence of this projection, since the fragile anodized aluminum edge of the movable member side does not contact the sliding surface of the vibration member, the wear resistance can be improved. Since this projection is located outside the edge portion of the vibration member structural body 1, this sliding surface can be subjected to lapping (a treatment for pressing a rotating smooth disk against a sample to improve the flatness and surface roughness of the sample; since the disk surface contacts only the outermost surface of the sample, a recess portion cannot be subjected to lapping) after coupling.

Figure 2F:
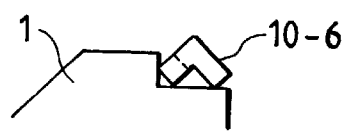
Figure 2C:
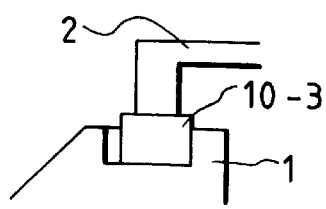
Figure 2G:
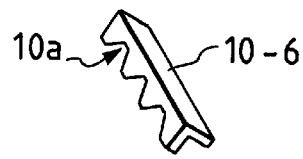

The sliding member may be press-fitted on the upper vibration member structural body 1 or may be expansion- or shrinkage-fitted thereon. In addition, an adhesion force by an adhesive may also be used. In this embodiment, coupling surfaces include a surface 1f parallel to the motor shaft and a surface 1e perpendicular to the motor shaft, and a gap 11-1 is formed between these surfaces so that the two surface do not cross each other. The coupling surface 1f serves to hold the sliding member 10-2 to be satisfactorily coaxial with the center of the motor shaft, and the coupling surface 1e serves to maintain high positional precision, in the motor shaft direction, of the sliding member 10-2. These two roles are common to the structure shown in FIG. 2A. In FIG. 2B, since the gap 11-1 is additionally formed, coupling (contact) on the coupling surface 1e is assured, and the positional precision, in the motor shaft direction, of the sliding member 10-2 is further improved. The coupling surface 1e may be located immediately below the trapezoidal portion. FIG. 2C shows an example wherein the outer circumferential side of a sliding member 10-3 is coupled to the vibration member structural body 1. The material of the sliding member includes ceramics such as alumina, silicon carbide, silicon nitride, SIALON, aluminum nitride, and the like; a material prepared by anodizing an aluminum alloy; inorganic materials such as graphite, glass, and the like; and cermets such as extra hard metals (carbide). Most of these materials are hard and can be good frictional members. In this case, since the breaking stress due to compression is relatively larger than the tensile stress, the outer circumferential surface side of the sliding member is used as one of the coupling surfaces. The sliding member consisting of any of the above-mentioned materials not only can provide a high frictional force but also can assure a high wear resistance. For this reason, the sliding member can satisfactorily serve as that for an ultrasonic wave motor. In addition, since the sliding member has small vibration attenuation unlike rubber or resin materials, it does not interfere with any vibration. However, such materials are not easy to work as compared to metals, and it is not practical to form the entire vibration member structural body using these materials. In this embodiment, it suffices to work a material which is not easy to work into a simple ring shape.

Figure 2D:
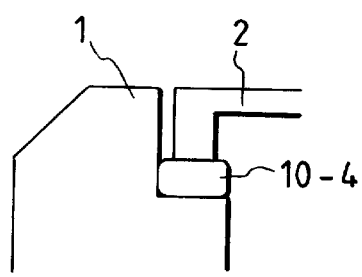

In FIG. 2D, the sliding surface of a sliding member 10-4 is subjected to lapping in advance, and then, the sliding member 10-4 is coupled to the vibration member structural body 1. The press-contact position with the movable member 2 is a lower position in FIG. 2D. In this example, frictional driving is attained at a position where the vibration direction of the sliding surface particles of the vibration member is changed.

In FIG. 2E, a member having a width corresponding to the upper bottom surface of the trapezoidal projection shown in FIG. 2B, i.e., a sliding member 10-5 obtained by cutting a thin pipe into a ring shape is press-fitted on the vibration member structural body 1. In order to assure the coupled state between the sliding member 10-5 and the vibration member structural body 1, a gap 11-2 is formed. In order to press-contact a coupling portion 1f against the sliding member 10-5, a groove 12 is formed in the vibration member structural body 1, so that a support portion 1g has a spring restoration force, thereby assuring the firmly coupled state. In FIG. 2F, a ring member whose sectional shape, cut along a plane including the center of the motor shaft, is an L shape, is press-fitted. The above-mentioned spring restoration force is provided to a sliding member 10-6 by forming grooves 10a in the sliding member 10-6 (see FIG. 2G). The sliding surface is defined by a portion near the ridge of the L-shaped section. Note that the sectional shape may be defined by a portion of an arc, a portion of a curve, a portion of a polygon, or a combination of a curve and a straight line in addition to the L shape. The objective of this shape is to improve the startability of the motor in addition to the effects described with reference to FIG. 2B. More specifically, since the sliding portion is defined by the ridge of a polygon or a portion of a curved surface, i.e., has a small width, the start performance of the motor can be improved. That is, in a high-humidity environment, the water content condenses into water in the narrow gap between the sliding surfaces of the movable member and the vibration member, and makes these members tightly contact each other. If the sliding surface is large, the tight contact force increases.

Figure 2H:
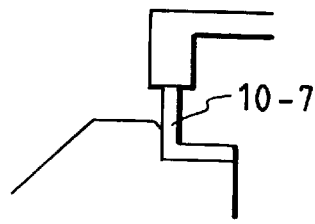

In FIG. 2H, a ring-shaped sliding member 10-7 having an L-shaped section is press-fitted, and a surface corresponding to its thickness is used as a sliding surface.

Figure 3:
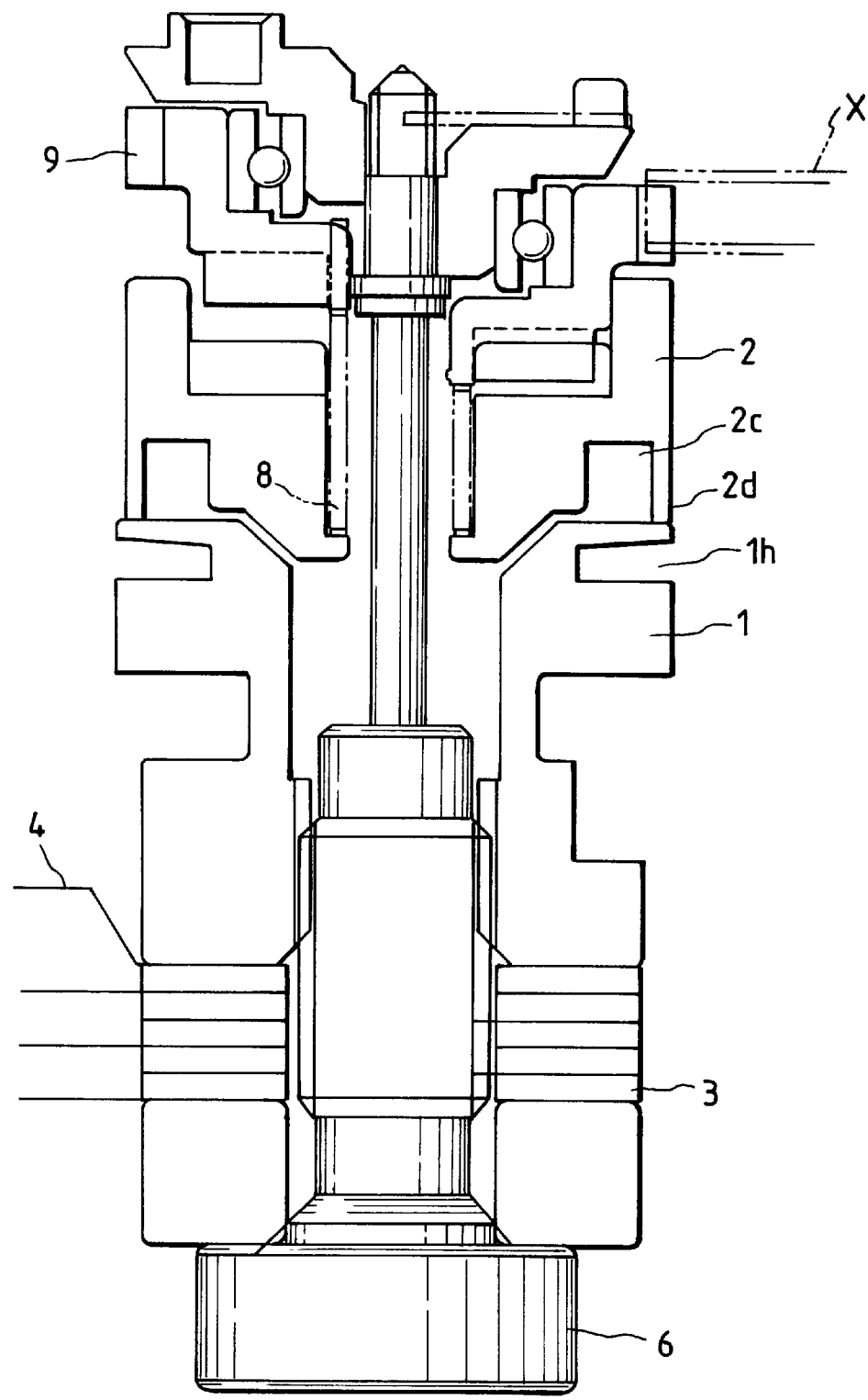
FIG. 3 is a sectional view of an ultrasonic wave motor as a basis of the second embodiment.

FIG. 3 shows an ultrasonic wave motor as a basis of the second embodiment. In FIG. 3, a groove 1h is formed in a portion, near the sliding surface, of the vibration member structural body 1 to provide rigid flexibility to the sliding surface of the vibration member. With this structure, the design of the movable member 2 requires only a groove 2c with a simple shape. Since a flange portion 2d of the movable member with this shape has no undercut portion unlike in FIG. 1, the movable member can be formed by press working.

Figure 4A:
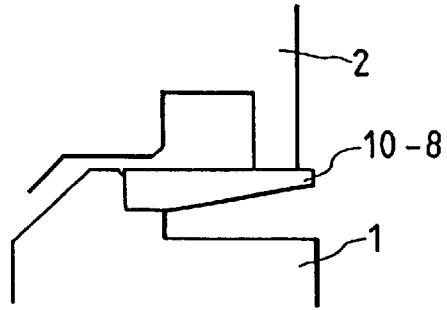
FIGS. 4A to 4F are enlarged views showing principal parts of the second embodiment.

FIGS. 4A to 4F show the second embodiment. FIG. 4A is an enlarged view of a portion near a sliding portion. In FIG. 4A, a separately formed sliding member 10-8 is press-fitted on the vibration member structural body 1.

Figure 4D:
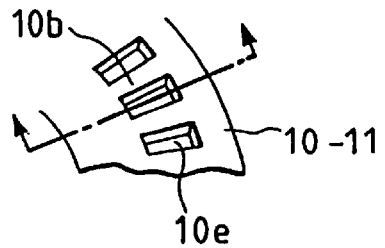
Figure 4B:
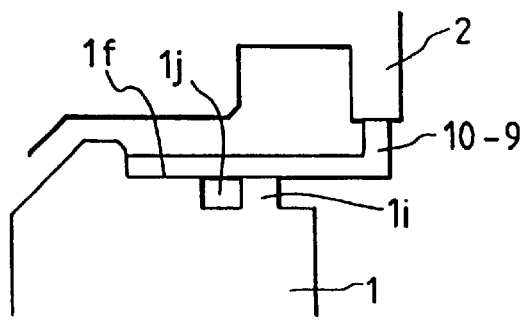

In FIG. 4B, a sliding member 10-9 prepared by press working is welded to the vibration member structural body 1 using a projection 1i. Since the welding can assure reliable metal coupling, a vibration is not disturbed. A groove 1j is formed to stabilize the degree of rigid flexibility of the above-mentioned sliding surface.

Figure 4E:
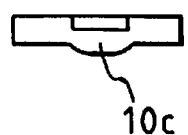
Figure 4C:
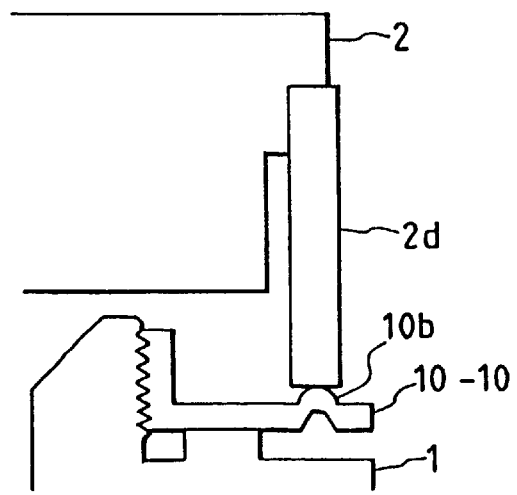

In FIG. 4C, a sliding member 10-10 is coupled by a screw. The screw coupling can assure the most reliable coupling. A projection 10b is an example of the projection described with reference to FIG. 2B, and is formed by press working. When the movable member 2 is divided into two members, as shown in FIG. 4C, an optimal sliding member can be selected without disturbing practicality upon working. In this embodiment, a member 2d consists of stainless steel, and the sliding member 10-10 consists of an aluminum alloy subjected to an anodizing treatment.

FIGS. 4D and 4E show an example wherein recesses 10e are formed in a surface 10b, which is in sliding contact with the movable member, of a sliding member 10-11. With this structure, the above-mentioned startability can be improved. On the contrary, when projections 10c are used as sliding portions, as shown in FIG. 4E, the same effect can be expected. Holes may be formed in place of the recesses, and each recess may extend between the inner and outer circumferential surfaces.

Figure 4F:
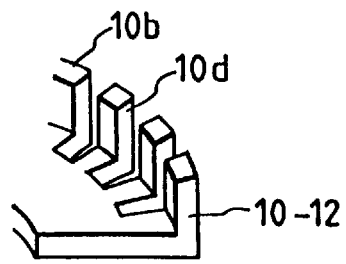

FIG. 4F shows an example wherein slits 10d are formed to provide the above-mentioned rigid flexibility to a sliding member 10-12. In this case, portions 10b serve as a sliding surface with the movable member 2. In FIG. 4F, the sliding member 10-12 has an L sectional shape, but may have a linear shape.

FIGS. 5A to 5E also show the second embodiment. FIG. 5A shows an example of a two-end support or fixing structure while the examples described so far provide the rigid flexibility using a cantilever shape. Since the direction of displacement is close to the direction of the center of the motor shaft, the structure shown in FIG. 5A is effective when a vibration displacement in this direction is required. A recess 10f of a sliding member 10-13 is formed to prevent the movable member from being decentered upon rotation.

In FIG. 5B, unlike in the examples explained so far, the outer circumferential surface side of a sliding member 10-14 is coupled to the vibration member structural body. As in the example shown in FIG. 5A, this structure is selected depending on the direction of vibration displacement. A sliding surface 10b is curled by press working. The effects of this structure are the same as those described with reference to FIG. 2B.

In FIG. 5C, a sliding member 10-15 is coupled to the vibration member structural body 1 by flattening and caulking a portion 1k. When the material used for the vibration member structural body 1 has a high ductility, this coupling method becomes a simple but reliable method. In this example, the sliding member 10-15 consists of phosphor bronze, and its surface is subjected to Ni-P galvanizing. In this example, after the sliding member 10-15 is formed, a surface treatment or surface coating such as galvanizing is performed.

In an example shown in FIG. 5D, unlike in FIG. 5C, a sliding member 10-16 is prepared by punching a material, which is subjected to a surface treatment or surface coating beforehand, by press working. With this process, since a treatment need not be performed for each member, the number of processes of the surface treatment or surface coating can be greatly reduced. For example, a pure aluminum or aluminum alloy plate is formed into the shape of the sliding member 10-16 by press progressive working. In this case, a large number of members are not disconnected but are kept connected via beams. After this material is subjected to an anodizing treatment, the respective members are disconnected from the beams to obtain individual sliding members. As the surface treatment, in addition to the anodizing treatment for aluminum, an iron alloy, a copper alloy, or the like selected as the material of the sliding member may be subjected to galvanizing of Cr, Ni alloy, Co, or the like, or stainless steel may be subjected to a nitriding treatment. As surface coating, resin coating, spray coating, or the like may be used. In this example, a recess portion serves as a sliding surface with respect to the movable member, contrary to the example shown in FIG. 5C. This is to not only suppress the above-mentioned decentering but also to expect the following effect. For example, as in the example of performing resin coating or spray coating, the thickness of a recess portion of a film in a molten state immediately after coating becomes larger than that of a flat portion due to its surface tension, as shown in FIG. 5D. That is, the thickness of only a film portion used as the frictional sliding member increases, and the durability of the motor can be improved.

In FIG. 5E, a sliding member has radial projections 10h formed at three positions by press working. Only these projections 10h contact the sliding portion of the movable member. Since there are three contact portions and they can define a plane, these projections can attain a uniform contact state with the sliding surface of the movable member without being subjected to lapping. The shape of each projection is not limited to a linear shape but may be a dot shape. On the other hand, each projection may form a certain angle with the radial direction of this member when it is formed into a linear shape. That is, each projection need not extend in the radial direction.

Figure 6A:
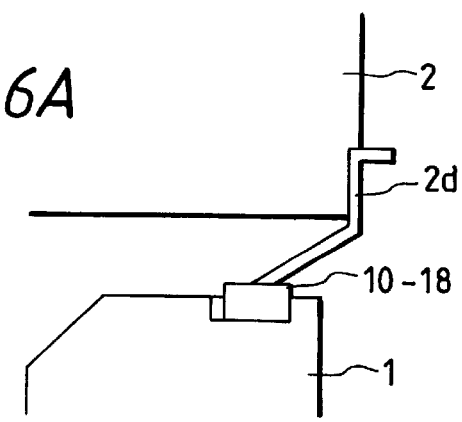
FIGS. 6A to 6C are enlarged views showing principal parts of the third embodiment.
Figure 6B:
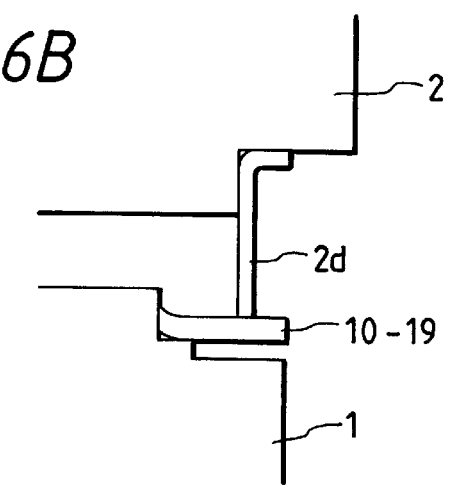
Figure 6C:
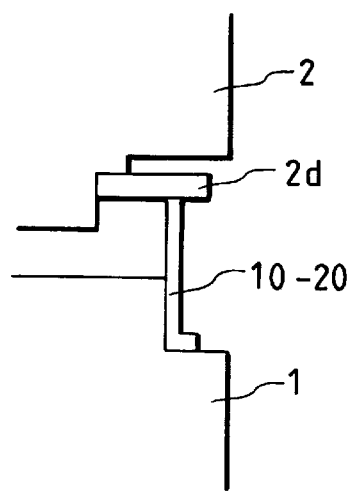

FIGS. 6A to 6C show the third embodiment. FIG. 6A shows an example wherein a flange member 2d for lowering the rigidity on the sliding surface is obliquely formed to achieve a deformation direction equivalent to that in FIG. 2F. In this example, the flange member 2d of the movable member consists of aging hardening stainless steel, and a sliding member 10-18 of the vibration member consists of an extra hard material. Stainless steel suffers a larger wear amount than the extra hard material. However, as the distal end of the flange member 2d is worn, the contact position of the sliding member (the ultra hard material) with the distal end of the flange member moves toward its outer circumferential surface, and both the materials are uniformly worn, thus improving the durability of the motor. FIG. 6B shows a structure wherein both the vibration member and the movable member have resiliency. Even when the distal end of the flange member 2d is considerably worn, the function as the motor can be maintained. In order to further improve the durability of the motor, the axial dimension of the flange member 2d is preferably increased. In this structure, a sliding member 10-19 of the vibration member preferably consists of a material having a higher wear resistance than that of the flange member 2d. FIG. 6C shows a disposition opposite to that shown in FIG. 6B.

Many materials of the flange member 2d and the sliding members 10-18 to 10-20 of the vibration member in FIGS. 6A to 6C were tested. As a result, the combinations shown in FIG. 7 exhibited good results in terms of wear resistance.

Figure 8:
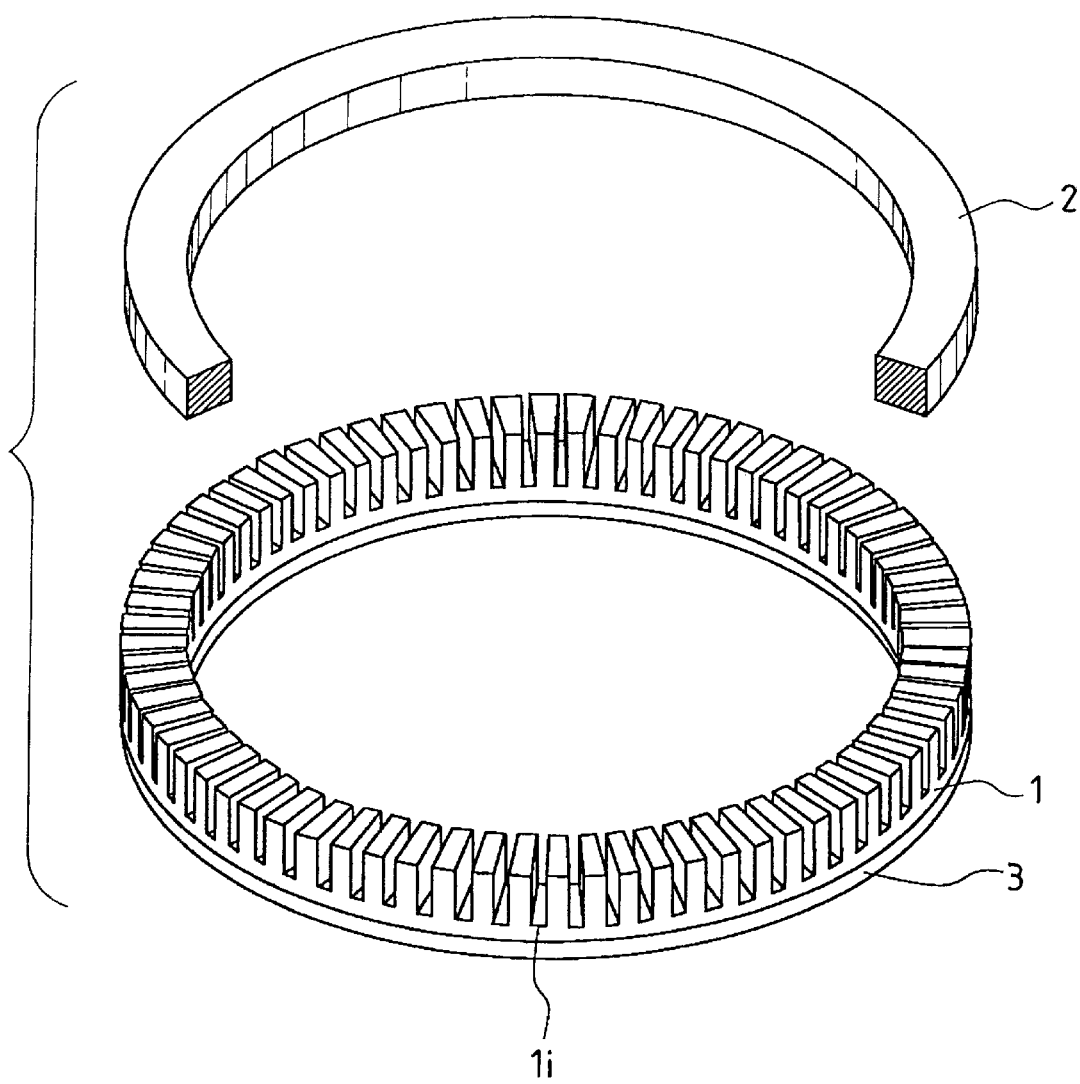
FIG. 8 is a perspective view of an ultrasonic wave motor as a basis of the fourth embodiment.
Figure 9A:
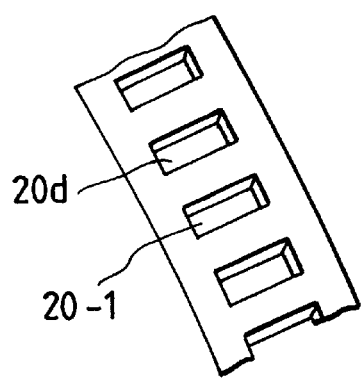
FIGS. 9A to 9E are enlarged views showing principal parts of the fourth embodiment.
Figure 9D:
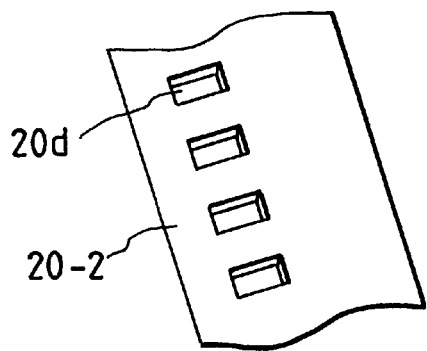
Figure 9B:
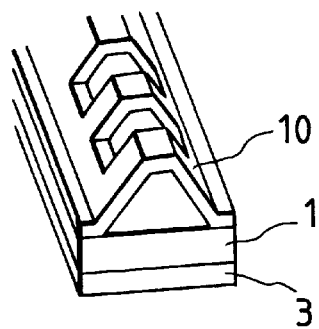

FIG. 8 shows a ring-shaped ultrasonic wave motor as a basis of the fourth embodiment. The details such as the driving principle of this motor are described in U.S. Pat. No. 4,831,305 and the like. In an ultrasonic wave motor of this type, a vibration member is constituted by adhering a piezoelectric member 3 to a vibration member structural body 1. A movable member 2 contacts the vibrator. A large number of grooves 1i are formed in the vibration member, and magnify the vibration displacement. Conventionally, since the grooves 1i must be formed by cutting or grinding, a large number of processes are required. In order to solve this problem, in the fourth embodiment, a plate 20-1 in which a plurality of holes 20d are formed by press working or etching, as shown in FIG. 9A, is press-molded, as shown in FIG. 9B, and is then firmly coupled to the vibration member structural body 1 by adhesion or welding. Since the vibration member has the above-mentioned structure, a bending vibration deformation produced in the vibration member structural body 1 can be reliably transmitted to the press-molded member, and the sliding member 20-1 can consist of a material which cannot be worked by cutting or grinding, thus greatly reducing the number of processes.

Figure 9E:
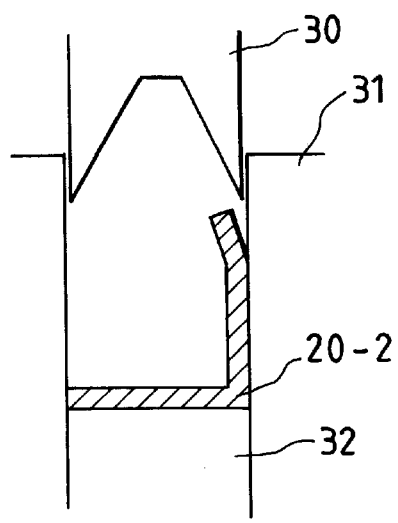
Figure 9C:
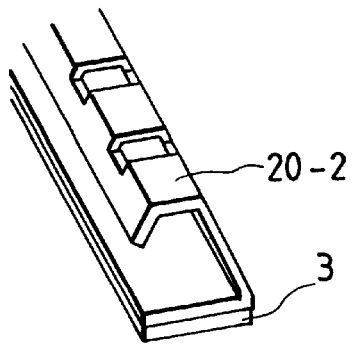

FIG. 9C shows a structure from which the vibration member structural body 1 is omitted. The piezoelectric member 3 is directly adhered to a sliding member 20-2 of the vibration member. FIG. 9D shows a press blank for the sliding member 20-2. As shown in FIG. 9D, holes 20d are formed in a ring-shaped member.

FIG. 9E shows a mold structure used when the member 20-2 is molded by press working.

Note that the mold structure includes stationary molds 31 and 32, and by pressing a movable mold 30 downward in FIG. 9E, the member 20-2 can be press-worked into the shape shown in FIG. 9C.

Figure 11:
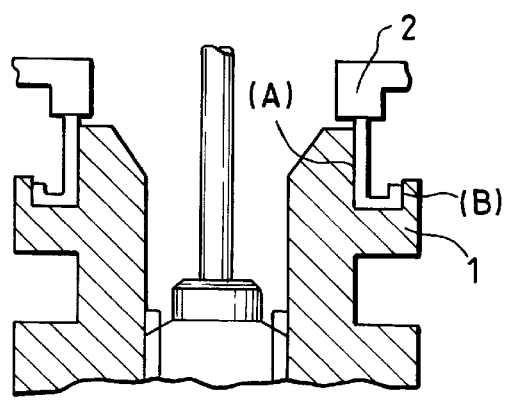
FIG. 11 is an enlarged view showing principal parts of the fifth embodiment.
Figure 12:
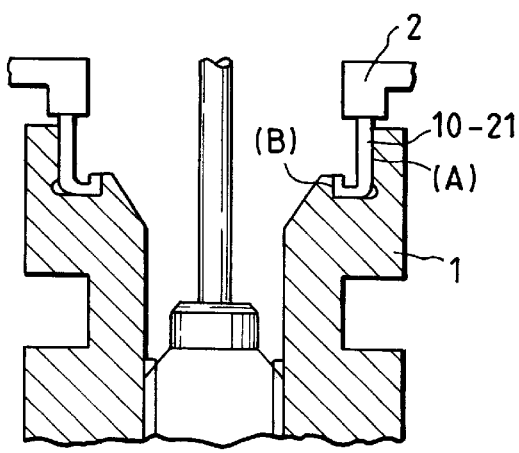
FIG. 12 is an enlarged view showing principal parts of the sixth embodiment.

FIGS. 11 and 12 respectively show the fifth and sixth embodiments. A substantially ring-shaped sliding member 10-21 is fitted in a vibration member structural body 1 at its inner circumferential surface (A) side, and is also fitted in the vibration member structural body 1 at its outer circumferential surface (B) side. The advantage of fitting at both the inner and outer circumferential surfaces will be explained below.

When the sliding member consisting of a different material is fitted in the vibration member structural body for the purpose of preventing a wear of the vibration member, the vibration member structural body and the sliding member consist of different materials (thermal expansion coefficients). For this reason, due to a change in environment such as a change in temperature, humidity, and the like, the fitting state changes, and a gap may be formed between the sliding member and the vibration member structural body. In such a case, upon rotation of the motor, the sliding member may rotate together with the movable member, which is in press-contact with the sliding member, due to the gap and the influence of, e.g., a vibration. As shown in FIGS. 13A to 14B, for example, when the vibration member structural body 1 consists of brass (BS) and the sliding member 2 consists of stainless steel (JIS SUS440C), since the thermal expansion coefficient of brass is higher than that of stainless steel, a gap is undesirably formed between the vibration member structural body and the sliding member (FIGS. 13A and 14B) in a low-temperature (−20° C.) environment in the case of fitting at only the inner diameter side and in a high-temperature (45° C.) environment in the case of fitting at only the outer diameter side, and the sliding member 2 may be undesirably rotated.

Figure 13A:
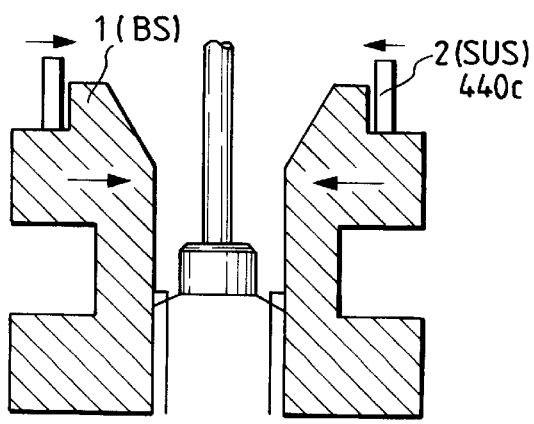
FIGS. 13A and 13B are explanatory views showing the states of a change in temperature.
Figure 13B:
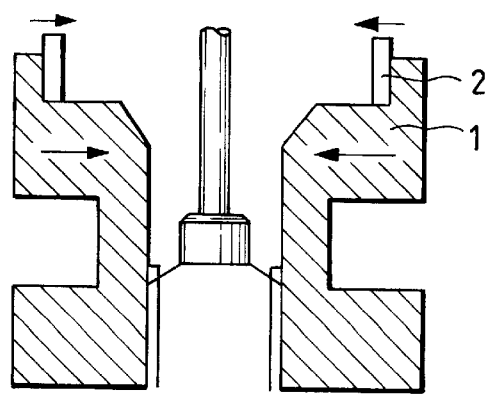
Figure 14A:
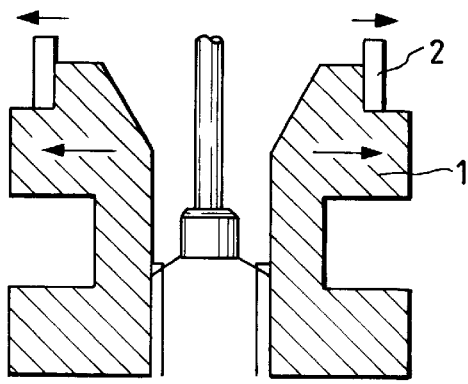
FIGS. 14A and 14B are explanatory views showing the states of a change in temperature.
Figure 14B:
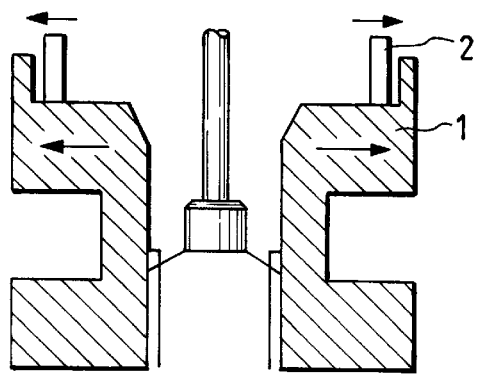

In the cases of FIGS. 13B and 14A, the two members change in a direction to eliminate the gap.

For example, when a substantially ring-shaped sliding member which has an inner diameter of about 8.5 mm and consists of SUS440C is subjected to a temperature change from 45° C. to −20° C., it is calculated that a gap of about 4 $\mu$m be formed between itself and a vibration member structural body consisting of a BS base material. Note that the sliding member may be fixed to the vibration member structural body by an adhesive. However, since the adhesive application position is in the vicinity of the contact portion between the vibration member and the movable member, the adhesion position and the adhesive amount must be strictly controlled, resulting in an increase in cost as a whole.

As shown in FIG. 11, the substantially ring-shaped sliding member 10-21 is fitted in the vibration member structural body 1 at its inner circumferential surface (A) side, and is also fitted in the vibration member structural body 1 at its outer circumferential surface (B) side. With this structure, even when a gap is formed at the (A) side due to a change in environment, no gap is formed at the (B) side in this case (and vice versa).

More specifically, when the sliding member 10-21 is fitted so that both its inner and outer circumferential surfaces contact the vibration member structural body 1, these members change in a direction to eliminate a gap at one side even when the environment (temperature) changes. For this reason, the sliding member 10-21 can be prevented from rotating with respect to the vibration member structural body 1 without using any adhesive.

In FIG. 12, the fitting state of the sliding member to the vibration member structural body is reversed to that shown in FIG. 11, and the same effect as in FIG. 11 is obtained. Note that the ring-shaped sliding member in FIGS. 11 and 12 has an L-shaped section. However, the present invention is not limited to the L-shaped section as long as the sliding member 10-21 is fitted in the vibration member structural body at both its inner and outer circumferential surfaces.

Figure 15:
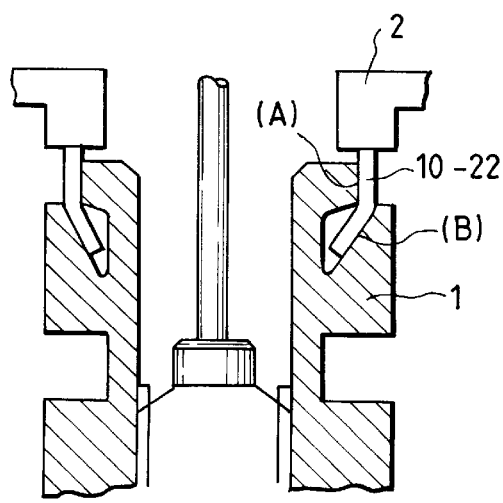
FIG. 15 is an enlarged view showing principal parts of the seventh embodiment.

FIG. 15 is an explanatory view of the seventh embodiment. In the seventh embodiment, a fitting bottom surface portion, to be inserted in a vibration member structural body 1, of a substantially ring-shaped sliding member 10-22 is slanted into a wedge shape.

In this case, as in the fifth and sixth embodiments, in an environment for forming a gap at a portion (A), a portion (B) acts in a direction to be in tight contact with the vibration member structural body; in an environment for forming a gap at the portion (B), a portion (A) acts in a direction to be in tight contact with the vibration member structural body. For this reason, the sliding member can be prevented from rotating.

Figure 16:
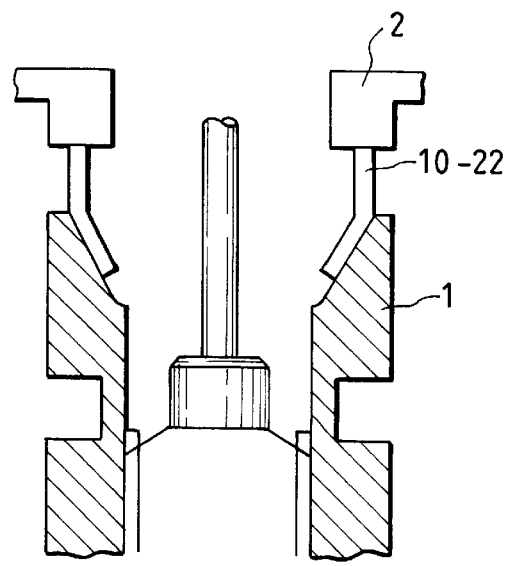
FIG. 16 is an enlarged view showing principal parts of the eighth embodiment.

In the seventh embodiment, as shown in FIGS. 15 and 16, the compression force from the movable member 2 is divided into components a and b, and the component a acts to take up the formed gap.

Figure 19:
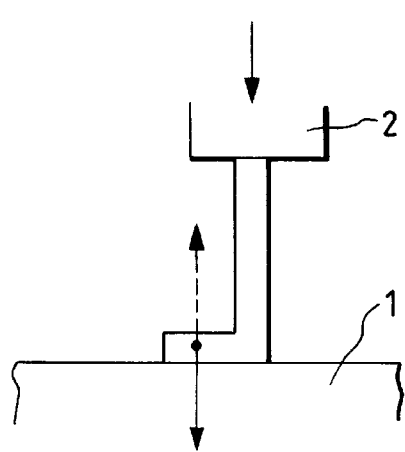
FIG. 19 is an explanatory view showing an operation.
Figure 20:
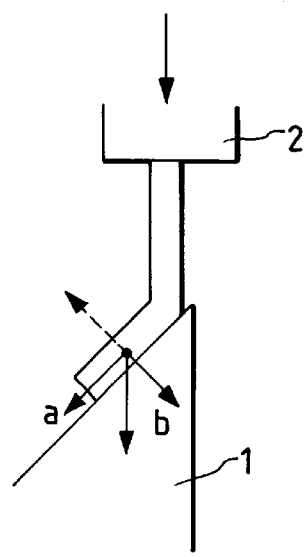
FIG. 20 is an explanatory view showing an operation.

The operation will be described below with reference to FIGS. 19 and 20. In the structure shown in FIG. 19, the compression force from the movable member 2 does not have a function of taking up a gap. However, as shown in FIG. 20, when the sliding member is formed into a wedge shape and is inserted, the component a moves the sliding member to take up a gap formed by a change in temperature.

Therefore, with this effect, as long as the sliding member 10-22 is always compressed by the movable member 2, the sliding member moves in a direction to eliminate the gap, thus obtaining a simple fitting structure.

Figure 17:
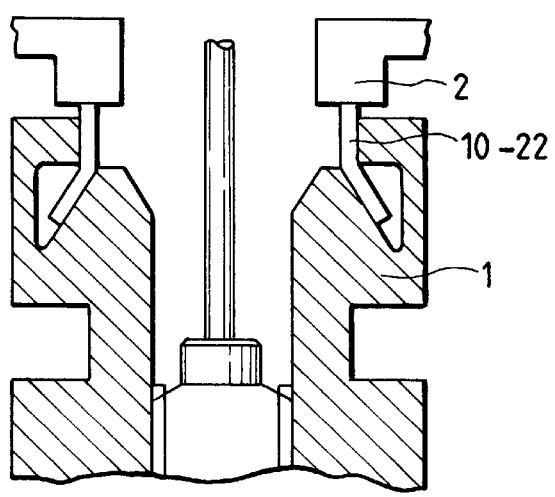
FIG. 17 is an enlarged view showing principal parts of the ninth embodiment.
Figure 18:
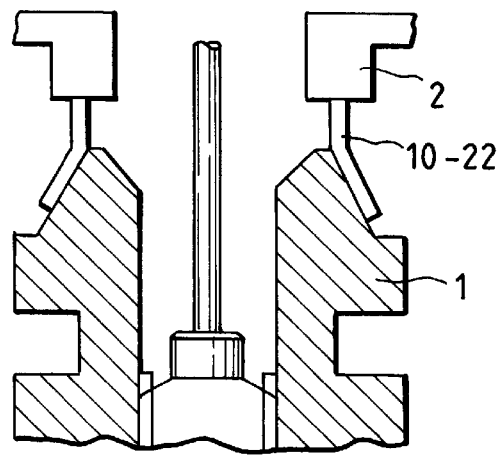
FIG. 18 is an enlarged view showing principal parts of the 10th embodiment.

FIGS. 16, 17, and 18 respectively show the eighth, ninth, and 10th embodiments. In these embodiments, the relationship between the inner and outer circumferential surfaces of a vibration member structural body and a sliding member are reversed.

Figure 21:
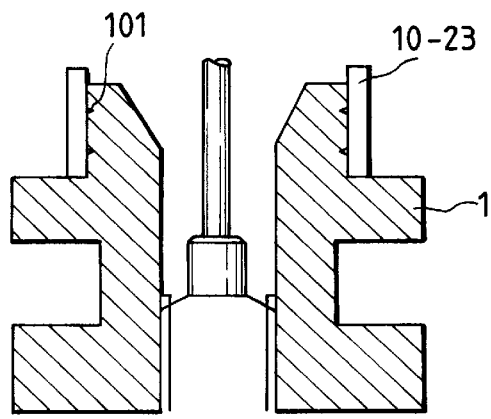
FIG. 21 is an enlarged view showing principal parts of the 11th embodiment.

FIG. 21 is an explanatory view of the 11th embodiment. In the 11th embodiment, projections 101 are formed on the inner circumferential surface of a sliding member 10-23, and the sliding member 10-23 is coupled to a vibration member structural body so that these projections 101 are press-fitted in and mesh with the vibration member structural body with a low hardness, thus attaining a firm fixed state. The shape of each projection is not particularly limited, and may be a mountain shape, three-dimensional shape, round shape, and the like. Also, an appropriate number of projections are formed in both the axial and circumferential directions.

Figure 22:
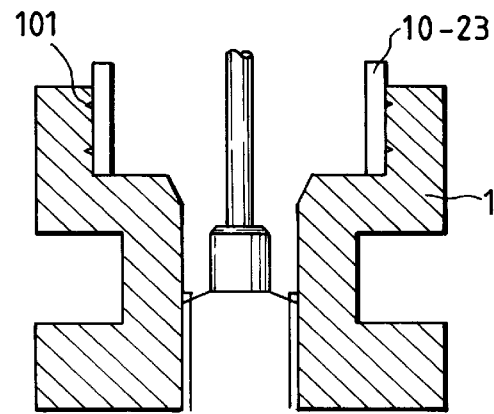
FIG. 22 is an enlarged view showing principal parts of the 12th embodiment.

FIG. 22 shows the 12th embodiment. In the 12th embodiment, projections 101 are formed on the outer circumferential surface of a sliding member 10-23. With this structure, a large frictional force in the circumferential direction can be assured between a vibration member structural body 1 and a sliding member 10-23, and the rotation of the sliding member 10-23 can be prevented independently of a change in environment.

Figure 23:
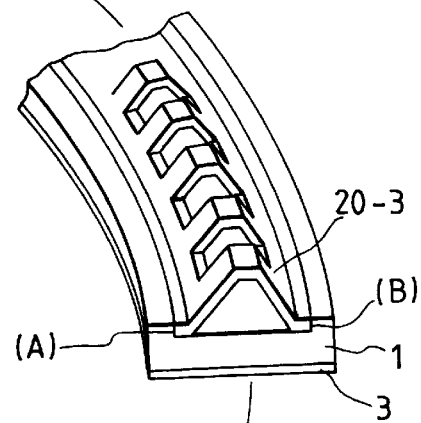
FIG. 23 is an enlarged view showing principal parts of the 13th embodiment.
Figure 24A:
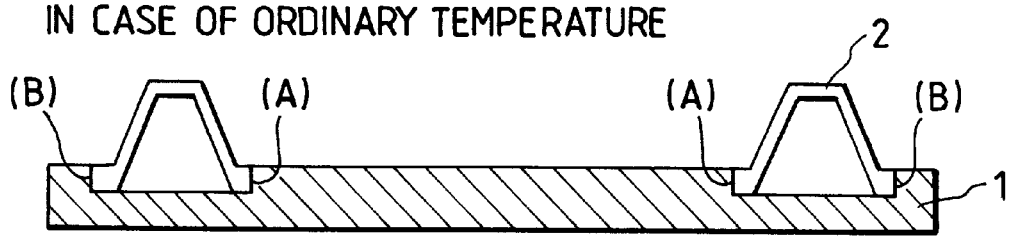
FIGS. 24A to 24C are explanatory views showing the states of a change in temperature.
Figure 24B:
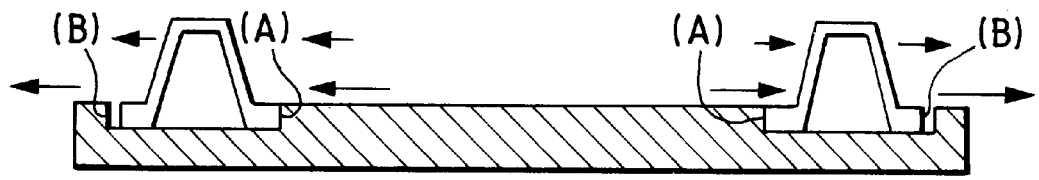
Figure 24C:
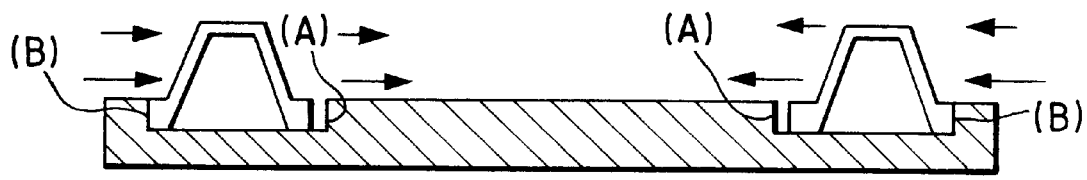

FIG. 23 shows a ring-shaped ultrasonic wave motor according to the 13th embodiment. A substantially ring-shaped sliding member 20-3 is formed by press working as in the embodiment shown in FIG. 9. In the 13th embodiment, a recess is formed in a vibration member structural body 1 to receive the sliding member 20-3 at both the inner and outer circumferential surfaces. With this structure, at room temperature shown in FIG. 24A, the sliding member 20-3 is fitted in the vibration member structural body 1 at both the inner circumferential surface (A) and the outer circumferential surface (B). Even when the vibration member structural body 1 consists of brass (BS) and the sliding member 20-3 consists of stainless steel (SUS), the inner circumferential surface (A) is strongly fitted in a high-temperature state shown in FIG. 24B, and the outer circumferential surface (B) is strongly fitted in a low-temperature state shown in FIG. 24C. Therefore, even when the two members have a thermal expansion coefficient difference based on a change in temperature, the sliding member 20-3 is strongly coupled to the vibration member structural body 1, and can be prevented from rotating or disengaging from the vibration member structural body 1.

In the fifth to 13th embodiments described above, the vibration member structural body undergoes a larger expansion than the sliding member in a high-temperature state. Even when this relationship is reversed, the same effect can be expected.

In each of the above-mentioned embodiments, the vibration member is fixed in position, and the movable member is moved. Alternatively, the movable member (contact member) may be fixed in position, and the vibration member may be moved. According to the present invention, the vibration member and the contact member need only be moved relative to each other by a vibration produced in the vibration member.

As described above, according to each of the above embodiments, a vibration actuator with high durability, high efficiency, and good startability can be provided by working a vibration member or contact member with simple working means.

Since a separate member attached to a vibration member defines the outermost surface, a post-treatment such as lapping is facilitated.

Since grooves or holes are formed in the separate member attached to the vibration member, it is easy to increase the magnitude of a vibration and to obtain a required vibration displacement.

Since projections or recesses are formed on the separate member attached to the vibration member, the motor startability can be improved.

When the separate member attached to the vibration member is formed by press working, workability can be improved, and grooves, holes, projections, or recesses can be easily worked.

Since the separate member attached to the vibration member is formed into a ring shape, the coupling process is facilitated, and the fitting portion upon coupling is set at its inner or outer diameter portion, thus solving problems caused by the characteristics and drawbacks of specific materials used.

What is claimed is:

1. A vibration actuator comprising:
    a vibration member for generating a vibration, said vibration member having a first member and a separate second member coupled to said first member, with said first member being a metallic plate-like member and having a plurality of projections or recesses; and
    a contact member contacting said vibration member and moving relative thereto when said vibration member vibrates, with said contact member having a first part and a separate second part coupled to said first part,
    wherein said first member of said vibration member has a higher coefficient of friction than said second member of said vibration member, and said first member is in sliding-contact with said second part of said contact member,
    and wherein said plurality of projections or recesses formed on said first member contact said second part at a plurality of contact portions.

2. A vibration actuator according to claim 1, further comprising an electro-mechanical energy conversion member in contact with said vibration member, where in said vibration member is vibrated when an electrical signal is applied to said electro-mechanical energy conversion member.

3. A vibration actuator according to claim 1, wherein said first member is coupled to a position of an outermost surface of said second member of said vibration member.

4. A vibration actuator according to claim 3, wherein said first member is formed to flex upon contact with said contact member.

5. A vibration actuator according to claim 1, wherein said first member is formed with one of either a groove and a hole.

6. A vibration actuator according to claim 5, wherein said first member is formed to flex upon contact with said contact member.

7. A vibration actuator according to claim 1, wherein said first member is formed with one of either a projection and a recess which is in sliding-contact with said contact member.

8. A vibration actuator according to claim 7, wherein said first member is formed to flex upon contact with said contact member.

9. A vibration actuator according to claim 1, wherein said first member is formed in a substantially ring shape.

10. A vibration actuator according to claim 9, wherein said first member is formed to flex upon contact with said contact member.

11. A vibration actuator according to claim 10, wherein said substantially ring-shaped first member has an inner and outer diameter and is coupled to said second member at one of either an inner and outer diameter portion thereof.

12. A vibration actuator according to claim 1, wherein said first member is formed to flex upon contact with said contact member.

13. A vibration actuator according to claim 1, wherein said first member is coupled to an inclined surface of said vibration member in a wedge-like shape.

14. A vibration actuator according to claim 1, wherein a surface of said first member is treated by one of galvanizing, spray coating, nitriding, and resin coating.

15. The vibration actuator according to claim 1, wherein said first member has a substantially uniform thickness.

16. The vibration actuator according to claim 1, wherein said second part of said contact member is metallic.

17. A vibration actuator according to claim 9, wherein said substantially ring-shaped first member has an inner and outer diameter and is coupled to said second member at one of either an inner and outer diameter side thereof.

18. A vibration actuator according to claim 9, wherein a surface of said first member is treated by one of galvanizing, spray coating, nitriding, and resin coating.

19. A vibration actuator according to claim 9, wherein said first member has an inner and outer diameter and is coupled to said second member by at least a portion of an inner and outer diameter portion thereof.

20. A vibration actuator according to claim 9, wherein said first member is coupled to an inclined surface of said vibration member in a wedge-like shape.

21. A vibration actuator comprising:
a vibration member for generating a vibration, said vibration member having a first member and a separate second member coupled to said first member, with said first member being a metallic plate-like member and having a plurality of projections or recesses; and
a contact member contacting said vibration member and moving relative thereto when said vibration member vibrates, with said contact member having a first part and a separate second part coupled to said first part, wherein said first member of said vibration member has a higher wear resistance than said second member of said vibration member, and said first member is in sliding-contact with said second part of said contact member,
wherein
said plurality of projections or recesses formed on said first member contacts said second part at a plurality of contact portions.

22. A vibration actuator according to claim 21, further comprising an electro-mechanical energy conversion member in contact with said vibration member, wherein said vibration member is vibrated when an electrical signal is applied to said electro-mechanical energy conversion member.

23. A vibration actuator according to claim 21, wherein said first member is coupled to a position of an outermost surface of said second member of said vibration member.

24. A vibration actuator according to claim 21, wherein said first member is formed with one of either a groove and a hole.

25. A vibration actuator according to claim 21, wherein said first member is formed with one of either a projection and a recess which is in sliding-contact with said contact member.

26. A vibration actuator according to claim 21, wherein said first member is formed in a substantially ring shape.

27. A vibration actuator according to claim 21, wherein said first member is formed to flex upon contact with said contact member.

28. A vibration actuator according to claim 23, wherein said first member is formed to flex upon contact with said contact member.

29. A vibration actuator according to claim 24, wherein said first member is formed to flex upon contact with said contact member.

30. A vibration actuator according to claim 25, wherein said first member is formed to flex upon contact with said contact member.

31. A vibration actuator according to claim 26, wherein said first member is formed to flex upon contact with said contact member.

32. A vibration actuator according to claim 21, wherein a surface of said first member is treated by one of galvanizing, spray coating, nitriding, and resin coating.

33. A vibration actuator according to claim 26, wherein a surface of said first member is treated by one of galvanizing, spray coating, nitriding, and resin coating.

34. A vibration actuator according to claim 26, wherein said substantially ring-shaped first member has an inner and outer diameter and is coupled to said vibration member at one of either an inner and outer diameter side thereof.

35. A vibration actuator according to claim 31, wherein said substantially ring-shaped first member has an inner and outer diameter and is coupled to said vibration member at one of either an inner and outer diameter portion thereof.

36. A vibration actuator according to claim 26, wherein said first member has an inner and outer diameter and is coupled to said vibration member by at least a portion of an inner and outer diameter portion thereof.

37. A vibration actuator according to claim 21, wherein said first member is coupled to an inclined surface of said vibration member in a wedge-like shape.

38. A vibration actuator according to claim 26, wherein said first member is coupled to an inclined surface of said vibration member in a wedge-like shape.

39. The vibration actuator according to claim 21, wherein said first member has a substantially uniform thickness.

40. The vibration actuator according to claim 21, wherein said second part of said contact member is metallic.

* * * * *

UNITED STATES PATENT AND TRADEMARK OFFICE
CERTIFICATE OF CORRECTION

PATENT NO. : 6,198,202 B1  
DATED : March 6, 2001  
INVENTOR(S) : Jun Tamai et al.

Page 1 of 1

It is certified that error appears in the above-identified patent and that said Letters Patent is hereby corrected as shown below:

Column 10,
Line 67, "where in" should read -- wherein --.

Signed and Sealed this

Twenty-ninth Day of January, 2002

Attest:

JAMES E. ROGAN
*Attesting Officer*   *Director of the United States Patent and Trademark Office*